United States Patent
Khani et al.

(10) Patent No.: US 10,046,309 B2
(45) Date of Patent: Aug. 14, 2018

(54) SUPPORTED NANOCATALYST FOR CATALYTIC REFORMING REACTIONS

(71) Applicants: Yasin Khani, Salmas (IR); Farzad Bahadoran, Tehran (IR); Zahra Shariatinia, Tehran (IR)

(72) Inventors: Yasin Khani, Salmas (IR); Farzad Bahadoran, Tehran (IR); Zahra Shariatinia, Tehran (IR)

(*) Notice: Subject to any disclaimer, the term of this patent is extended or adjusted under 35 U.S.C. 154(b) by 0 days.

(21) Appl. No.: 15/460,193

(22) Filed: Mar. 15, 2017

(65) Prior Publication Data
US 2017/0182480 A1  Jun. 29, 2017

Related U.S. Application Data

(60) Provisional application No. 62/355,349, filed on Jun. 28, 2016.

(51) Int. Cl.
| | | |
|---|---|---|
| B01J 23/10 | (2006.01) | |
| B01J 37/34 | (2006.01) | |
| B01J 37/02 | (2006.01) | |
| B01J 37/08 | (2006.01) | |
| B01J 23/755 | (2006.01) | |
| B01J 37/06 | (2006.01) | |

(52) U.S. Cl.
CPC ............ *B01J 23/10* (2013.01); *B01J 23/755* (2013.01); *B01J 37/0201* (2013.01); *B01J 37/06* (2013.01); *B01J 37/08* (2013.01); *B01J 37/343* (2013.01)

(58) Field of Classification Search
CPC ...... B01J 23/10; B01J 37/343; B01J 37/0201; B01J 37/08; B01J 23/755; B01J 37/06
See application file for complete search history.

(56) References Cited

U.S. PATENT DOCUMENTS

| | | |
|---|---|---|
| 7,108,804 B2 | 9/2006 | Lu et al. |
| 7,771,586 B2 | 8/2010 | Ratnasamy et al. |
| 7,824,656 B2 | 11/2010 | Idem et al. |
| 2002/0009406 A1 | 1/2002 | Kourtakis et al. |
| 2005/0096215 A1 | 5/2005 | Espinoza et al. |
| 2009/0026419 A1 | 1/2009 | Xu |

FOREIGN PATENT DOCUMENTS

| | | |
|---|---|---|
| CA | 2392106 A1 | 5/2001 |
| EP | 0692451 B1 | 5/2000 |

*Primary Examiner* — Melvin C. Mayes
*Assistant Examiner* — Michael Forrest
(74) *Attorney, Agent, or Firm* — NovoTechIP International PLLC

(57) ABSTRACT

A catalyst support comprising samarium, zirconium and aluminum is disclosed. The catalyst support may have a general formula of $Sm_{2x}Zr_xAl_{2x}O_4$, in which x is a molar ratio that may be between 0.3 and 0.6.

19 Claims, 22 Drawing Sheets

1201

1202

1203

1204

SUPPORTED NANOCATALYST FOR CATALYTIC REFORMING REACTIONS

CROSS REFERENCE TO RELATED APPLICATION

This application claims the benefit of priority from U.S. Provisional Patent Application Ser. No. 62/355,349, filed on Jun. 28, 2016, and entitled "NANOCATALYST FOR REFORMING OF METHANE," which is incorporated herein by reference in its entirety.

TECHNICAL FIELD

The present disclosure generally relates to catalysts and catalyst supports, particularly to catalysts and catalyst supports for catalytic reforming reactions.

BACKGROUND

Methane may be converted to heavier liquids and hydrocarbons, such as methanol, formaldehyde, benzene, propanol and aromatics, by catalytic methane reforming reactions. The synthesis gas (also referred to as syngas) is a product of catalytic methane reforming reactions. Syngas may be produced by different methods including steam reforming of methane (SRM), dry reforming of methane (DRM), auto thermal reforming, and partial oxidation of methane. Steam reforming of methane is generally considered the more economical method, and is widely used for hydrogen production. However, this process presents some drawbacks, including a high ratio of hydrogen to carbon monoxide produced as the products of the reaction:

$$CH_4 + H_2O \rightleftharpoons CO + 3H_2 \quad \text{(steam reforming, SRM)}$$

Since most processes, such as Fischer-Tropsch, use syngas as a feed in which the hydrogen to carbon monoxide ratio must be equal to 2, improvement of the hydrogen to carbon monoxide ratio seems to be necessary. One simple method for reducing the hydrogen to carbon monoxide ratio is separation of excess hydrogen from the syngas. Another method for improvement of the hydrogen to carbon monoxide ratio is the injection of carbon dioxide into the reforming feed, where the resulting reaction will be as follows:

$$3CH_4 + 2H_2O + CO_2 \rightleftharpoons 4CO + 8H_2 \quad \text{(combined dry-steam reforming, CRM)}$$

In recent decades, the method of dry reforming of methane has attracted great attention from both industrial and environmental groups. It is noteworthy that the syngas produced by this method has a low $H_2/CO$ ratio.

$$CH_4 + CO_2 \rightleftharpoons 2CO + 2H_2 \quad \text{(dry reforming, DMR)}$$

In catalytic methane reforming reactions, the active metal of the catalyst has a significant role in its activity. Two kinds of metals may be utilized as active metal catalysts including noble metals (such as platinum, rhodium and rhenium) and other non-noble metals (such as nickel).

SUMMARY

In one general aspect, the present disclosure describes a catalyst support that may include samarium, zirconium and aluminum. The catalyst support may have a general formula of $Sm_{2x}Zr_xAl_{2x}O_4$, in which x is a molar ratio that may be between 0.3 and 0.6.

In another general aspect, the present disclosure describes a catalyst for catalytic reforming reactions. The catalyst may include an active metal supported on a catalyst support. The active metal may be selected from nickel, copper, cobalt, noble metals, or combinations thereof. The catalyst support may include samarium, zirconium and aluminum and the catalyst may have a general formula of $A/Sm_{2x}Zr_xAl_{2x}O_4$, in which x is a molar ratio that may be between 0.3 and 0.6 and A denotes the active metal.

In yet another general aspect, the present disclosure describes a method for preparing a catalyst support. The method may include steps of: dissolving samarium, zirconium, and aluminum precursors in water to obtain a first solution; adding a solution of glycerin to the first solution to obtain a first suspension; heating the first suspension to obtain a concentrated gel; and calcining the concentrated gel to obtain a powder of the catalyst support.

According to some implementations, the samarium, zirconium, and aluminum precursors may be in the form of water-soluble salts, such as nitrate, chloride, or acetate salts and the precursors may be dissolved in water with a molar ratio of 1:0.5:1 (samarium precursor:zirconium precursor:aluminum precursor).

According to an implementation, the samarium precursor may be $Sm(NO_3)_3 \cdot 6H_2O$. According to another implementation, the zirconium precursor may be selected from $ZrO(NO_3)_2 \cdot xH_2O$, $ZrOCl_2 \cdot xH_2O$, or $ZrCl_4$. According to yet another implementation, the aluminum precursor may be $Al(NO_3)_3 \cdot 9H_2O$.

According to some implementations, the solution of glycerin may be added to the first solution such that the weight ratio of the total weight of the salts to the added glycerin becomes 1:10 to 1:20 in the obtained first suspension.

According to other implementations, calcining the concentrated gel to obtain a powder of the catalyst support may include calcining the concentrated gel in a furnace for a specific amount of time at a temperature of between 600° C. and 800° C. with a heating rate of 2° C./min.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
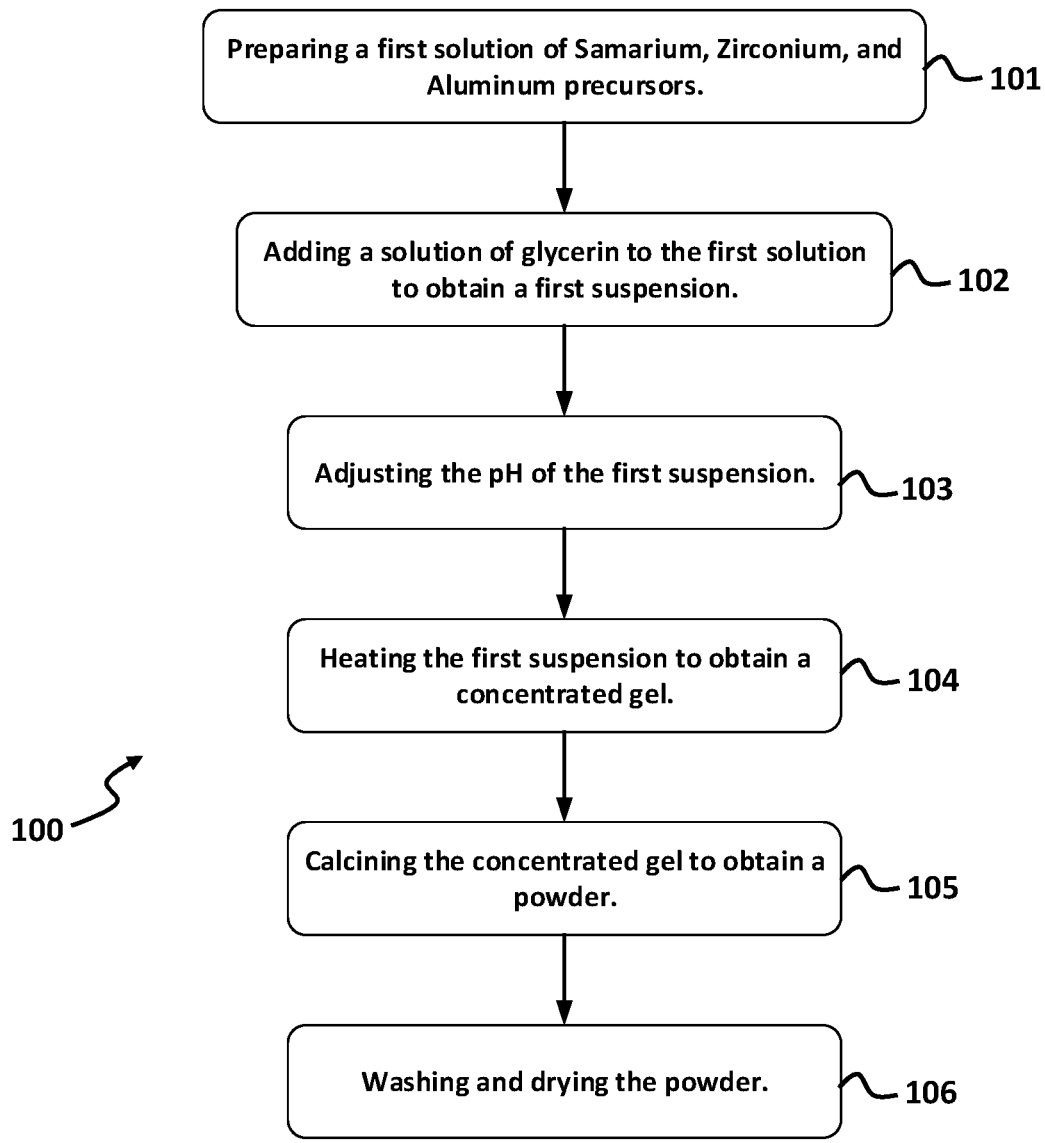
FIG. 1 illustrates an implementation of a method for synthesizing a catalyst support according to one or more aspects of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, and/or components have been described at a relatively high-level, without detail, in order to avoid unnecessarily obscuring aspects of the present teachings.

Design and production of catalysts and catalyst supports are an important aspect of the methane reforming industry. In catalytic reforming reactions, high temperatures and pressures and the presence of hydrocarbons and water vapor provide a severe environment for the catalysts that may result in some problems. These problems may include but are not limited to sintering or agglomeration, as well as carbon formation on the catalyst surface.

For a catalyst to be effective it must have an effective interface with the reactants, and a high surface area. Large surface areas can be thermodynamically unstable, and given certain conditions such as high temperatures the catalysts may rearrange to form agglomerates. This agglomeration of catalysts is known as sintering, which causes a decrease in the availability of active sites on a catalyst.

A catalyst support protects, stabilizes, and disperses the active metal catalyst and prevents the catalyst from sintering and/or the agglomeration of catalysts due to temperature shocks. As noted above, sintering or agglomeration is the attachment of catalytic active sites to one another due to high reaction temperatures. Sintering can result in the loss of catalytic activity and/or selectivity over time. Sintering of catalyst particles at high temperatures may take place via migration of particles to their nearby particles, or migration of particles to the catalyst support and bonding of the particles with one another. With the growth of the catalyst particles, the surface area decreases and this may lead to a reduction in catalytic activity. Therefore, the catalyst support selected must have excellent physical, textural, and structural properties.

It is notable that higher specific surface area and pore volume of the support may lead to a higher number (percent) of the active metal that may be placed on the support. Common supports that may be used in designing catalysts (such as gamma-alumina) are usually rapidly coke-deposited (see below) and deactivated. The replaced zeolitic supports may not have great industrial applications because of their low thermal resistance. Consequently, in order to activate a catalyst with high thermal stability, high activity, and resistance against coke deposition, modification of common supports and the design of novel supports are necessary.

Carbon (or coke) formation is another problem in the reforming processes. Carbon may be deposited on the catalytic sites and this may result in deactivation and destruction of the catalyst particles and consequently the pressure in the reactor may decrease. Moreover, carbon particles may be deposited on the surface of heat exchanger tubes which may result in a reduction in the heat transfer coefficient. Usually, coke or carbon is produced by the two main reactions, i.e., the Boudouard reaction and the methane cracking reaction as follows.

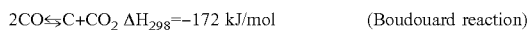

2CO⇋C+CO$_2$ ΔH$_{298}$=−172 kJ/mol          (Boudouard reaction)

CH$_4$⇋C+2H$_2$ ΔH$_{298}$=75 kJ/mol          (methane cracking reaction)

Noble metal catalysts have shown higher resistance against deactivation by coke formation and have higher activity compared with non-noble nickel catalysts, which are prone to deactivation by coke deposition and sintering of Ni active sites. However, high costs and limited sources of noble metals may necessitate investigations on the improvement of nickel catalysts to achieve a higher resistance against coke formation.

The methane reforming industry can benefit greatly from the introduction of new catalysts and catalyst supports for improving the thermal stability, activity, and resistance of currently-used catalysts for catalytic methane reforming reactions. Disclosed herein is a catalyst support for catalytic reforming reactions that may include samarium, zirconium, and aluminum. The catalyst support of the present disclosure may be utilized for synthesizing supported catalysts for different catalytic reforming reactions. Benefits from utilizing the disclosed support may include but are not limited to improving the thermal stability, activity, and resistance of the catalyst by limiting or preventing the catalyst from sintering and agglomeration due to temperature shock and also by limiting or preventing coke formation.

FIG. 1 illustrates a method 100 for synthesizing a catalyst support according to one or more exemplary implementations of the present disclosure. In one implementation, the method 100 may include a first step 101 of preparing a first solution of samarium (Sm), zirconium (Zr), and aluminum (Al) precursors in distilled water; a second step 102 of adding a solution of glycerin to the first solution to obtain a first suspension; an optional third step 103 of adjusting the pH of the first suspension to an alkaline pH; a fourth step 104 of heating the first suspension to obtain a concentrated gel; a fifth step 105 of calcining the obtained concentrated gel to obtain a powder; and an optional sixth step 106 of washing and drying the powder to obtain the catalyst support.

Referring to FIG. 1, first step 101 may further involve dissolving a Sm precursor, a Zr precursor, and an Al precursor in distilled water using mechanical agitation and then subjecting the solution to ultrasonic irradiation. For example, according to some implementations, Sm, Zr, and Al precursors may be mixed with a molar ratio of 1:0.5:1 (Sm:Zr:Al). According to an implementation, Sm, Zr, and Al precursors may be in the form of a water-soluble salt such as, for example, nitrate, chloride, or acetate salts or combinations thereof.

In an exemplary implementation, the salts may include $Sm(NO_3)_3 \cdot 6H_2O$, $ZrO(NO_3)_2 \cdot xH_2O$, and $Al(NO_3)_3 \cdot 9H_2O$. In another exemplary implementation, the Zr precursor may be zirconium oxynitrate ($ZrO(NO_3)_2 \cdot xH_2O$), zirconium oxychloride ($ZrOCl_2 \cdot xH_2O$), zirconium chloride ($ZrCl_4$), or a mixture thereof.

Referring to FIG. 1, in some implementations, in step 102 of method 100 a solution of glycerin may be added to the first solution such that the weight ratio of the total weight of the salts to the added glycerin becomes 1:10 to 1:20 in the obtained first suspension. For example, in an implementation, for every gram of the total weight of the three Sm, Zr, and Al salts, 10 to 20 grams of glycerin may be present in the first suspension.

With respect to third step 103, according to an implementation, the pH of the first suspension may optionally be adjusted. For example, in one implementation, the pH can be adjusted to an alkaline pH of about 12 by adding a solution of a soluble base, such as $NH_4OH$ solution.

Referring now to fourth step 104, in an implementation, the first suspension may be heated up to a temperature of approximately 50° C., while being stirred for about 48 hours, in order to obtain a concentrated gel.

With respect to fifth step 105, in an exemplary implementation, the obtained gel may be calcined in a furnace for a specific amount of time. For example, in one implementation, the gel may be calcined in a furnace at a temperature of between 600° C. and 800° C. with a heating rate of approximately 2° C./min. It should be understood that the gel may be calcined at other heating rates in other implementations. Not bound by any particular theory, the added glycerin may burn away in the furnace as a fuel and it may increase the calcination temperature in the furnace. In some cases, the resultant product after calcination may be in the form of a powder that may contain the synthesized catalyst support along with some impurities.

With further reference to FIG. 1, after calcination and obtaining the powder containing the synthesized catalyst support, method 100 may proceed to the optional sixth step 106 that may involve washing the obtained powder with a washing agent such as ethanol. The washed powder may then be dried to obtain the catalyst support of the present disclosure.

In some implementations, the catalyst support that may be synthesized as described in detail in connection with the method 100 of FIG. 1 may include Sm, Zr, and Al with a general formula of $Sm_{2x}Zr_xAl_{2x}O_4$ where x is a molar ratio greater than zero that may vary based on the molar ratio of the precursors in the first solution. In an exemplary implementation, x may be between 0.3 and 0.6.

Figure 2:
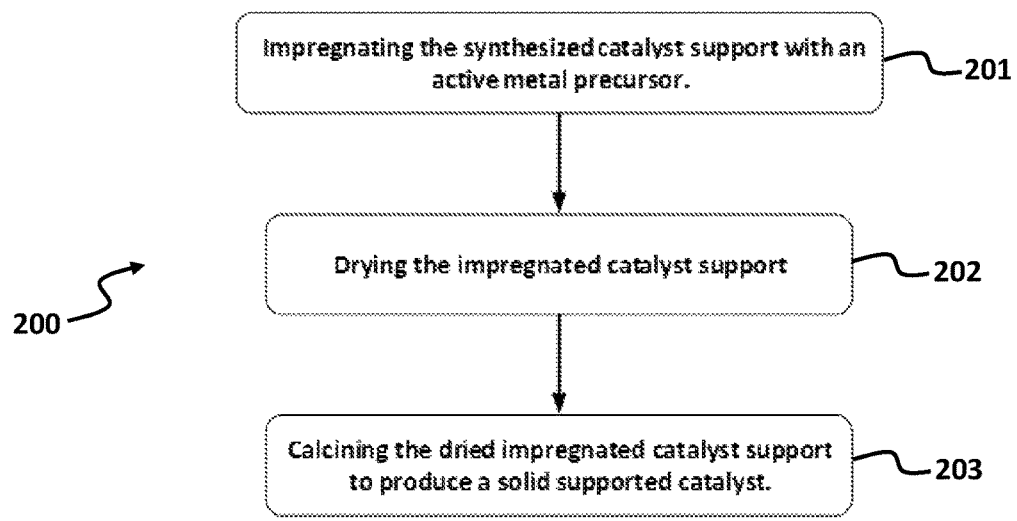
FIG. 2 illustrates an implementation of a method for synthesizing a supported catalyst, according to one or more aspects of the present disclosure.

FIG. 2 illustrates an exemplary method 200 for synthesizing a supported catalyst, according to one or more implementations of the present disclosure. The method 200 may include a first step 201 of impregnating the synthesized catalyst support with an active metal precursor using, for example, a wet impregnation method; a second step 202 of drying the impregnated catalyst support; and a third step 203 of calcining the dried impregnated catalyst support to produce a solid supported catalyst.

Referring to FIG. 2, first step 201 may involve preparing a solution of an active metal precursor in water under ultrasound irradiation and then adding the prepared solution to the synthesized support in an ultrasonic bath for the impregnation to occur. In an implementation, the active metal may be selected from nickel, copper, cobalt, or noble metals. Furthermore, in some implementations, the active metal precursor may be a water-soluble salt of the active metal. In an exemplary implementation, the active metal precursor may be a nitrate salt of the active metal.

In another exemplary implementation, the active metal may be nickel and the active metal precursor may be $Ni(NO_3)_2 \cdot 6H_2O$. A specific amount of $Ni(NO_3)_2 \cdot 6H_2O$ solution may be used in the wet impregnation process such that the final amount of nickel in the synthesized catalyst becomes a weight percent of between 5% to 20% of the total weight of the synthesized catalyst.

Referring again to FIG. 2, after impregnating the synthesized catalyst support with the active metal precursor (first step 201), method 200 may proceed to second step 202, where the impregnated catalyst support may be dried overnight at a temperature of approximately 120° C.

With respect to third step 203, the dried impregnated catalyst support may be calcined at a temperature of, for example, at least 700° C. for a specific amount of time. For example, the catalyst support can be calcined for two hours with a specific heating rate of, for example, 2° C./min in order to obtain the solid supported catalyst with a general formula of $A/Sm_{2x}Zr_xAl_{2x}O_4$, where A denotes the active metal that may be Ni, Cu, Co, or noble metals with a weight percent of about 5 to about 20 based on the total weight of the supported catalyst.

EXAMPLES

Although the examples set forth here are related to catalytic reforming of methane, it should be noted that the application of the disclosed catalyst support and the catalyst is not limited to catalytic reforming of methane. In different implementations, the disclosed catalyst and catalyst support may be used in other processes, such as catalytic reforming of methanol or Fischer-Tropsch process based on the active metal used in the synthesis process of the catalyst.

Example 1: Synthesis of the Catalyst Support and the Catalyst

In this first example, a $SmZr_{0.5}AlO_4$ support is synthesized according to the exemplary method of FIG. 1. To this end, a first solution of $Sm(NO_3)_3.6H_2O$, $ZrO(NO_3)_2.xH_2O$ and $Al(NO_3)_3.9HO$ salts with molar ratios of 1:0.5:1 was prepared in distilled water under ultrasonic irradiation. After that, a solution of glycerin was added to the first solution, such that the molar ratio of salts to glycerin becomes 2.5:20. The pH of the resultant suspension was adjusted to about 12 using a solution of $NH_4OH$. Then, the suspension was heated up to 50° C. and stirred for about 48 hours in order to obtain a concentrated gel. The concentrated gel was then calcined in a furnace for about 10 hours at a temperature of approximately 800° C. with a heating rate of 2° C./min. A white powder was obtained after calcination in the furnace, which was washed with ethanol and then was dried in order to obtain the $SmZr_{0.5}AlO_4$ support.

In order to synthesize a supported 10% Ni nanocatalyst on the $SmZr_{0.5}AlO_4$ support, a wet impregnation method as described in connection with FIG. 2 was utilized. Here, a predetermined amount of $Ni(NO_3)_2.6H_2O$ solution was added to the $SmZr_{0.5}AlO_4$ support in an ultrasonic bath followed by an overnight drying process at 120° C. and then calcinated at 700° C. for 2 h with a heating rate of 2° C./min in order to obtain the 10% $Ni/SmZr_{0.5}AlO_4$ catalyst powder. The resultant catalyst powder was prepared as a tablet.

Example 2: Catalytic Activity Experiments

Figure 3:
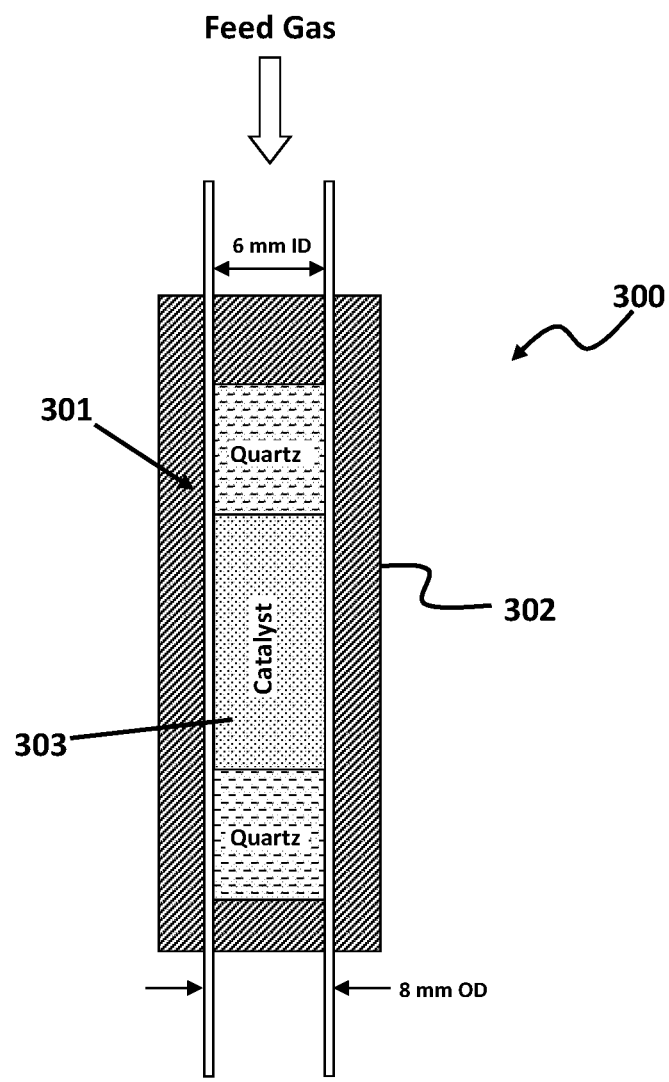
FIG. 3 illustrates a schematic of an implementation of a reactor for catalytic reforming of methane, according to an implementation of the present disclosure.

Referring now to FIG. 3, a schematic of an exemplary reactor for catalytic reforming of methane is depicted, according to exemplary implementations of the present disclosure. In FIG. 3, the catalytic reforming of methane may be carried out under atmospheric pressure in a flow system 300 that may be equipped with a fixed bed quartz reactor ("reactor") 301. In one implementation, the fixed bed quartz reactor may comprise an inside diameter (ID) of approximately 6 mm and an outside diameter (OD) of approximately 8 mm that may be equipped with an electrical furnace 302. In this example, 0.30 g of 10% $Ni/SmZr_{0.5}AlO_4$ as a nanocatalyst 303 was loaded in the reactor 301 and three different catalytic reforming reaction were separately carried out, namely, dry reforming of methane (DRM), steam reforming of methane (SRM), and combined reforming of methane (CRM). The nanocatalyst 303 was pre-treated for 2 hours at 700° C. in a stream of 1:3 $H_2/Ar$ for activation of 10% $Ni/SmZr_{0.5}AlO_4$ prior to the catalytic reforming reactions. In this example, a nanocatalyst with a mesh size of 20-40 was utilized for the DRM reaction; a nanocatalyst with a mesh size of 60-80 was utilized for the SRM reaction; and a nanocatalyst with a mesh size of 40-50 was utilized for the CRM reaction.

In the DRM reaction, methane and carbon dioxide (as feed gas) with Ar as a diluent (in a 1:1:3 molar ratio) were used. In the SRM reaction, the optimum $H_2O/CH_4$ ratio of 3 was selected for the catalytic reaction experiments and a mixture of $H_2O/CH_4/Ar$ with a molar ratio of 3:1:2 was used as the feed gas. In the CRM reaction, the optimum ratio of $Ar/CH_4/CO_2/H_2O$ was equal to 1:2:1:1.5.

All of the reforming reactions were performed using feed gas with a gas hourly space velocity (GHSV) of about 10500 $h^{-1}$ (equal to a weight hourly space velocity (WHSV) of about 3 L/h) under atmospheric pressures at various temperatures (i.e., 600, 650, 700, 750 and 800° C.). The compositions of the streams (reactants and products) were determined by an on-line three channel gas chromatograph.

Figure 4A:
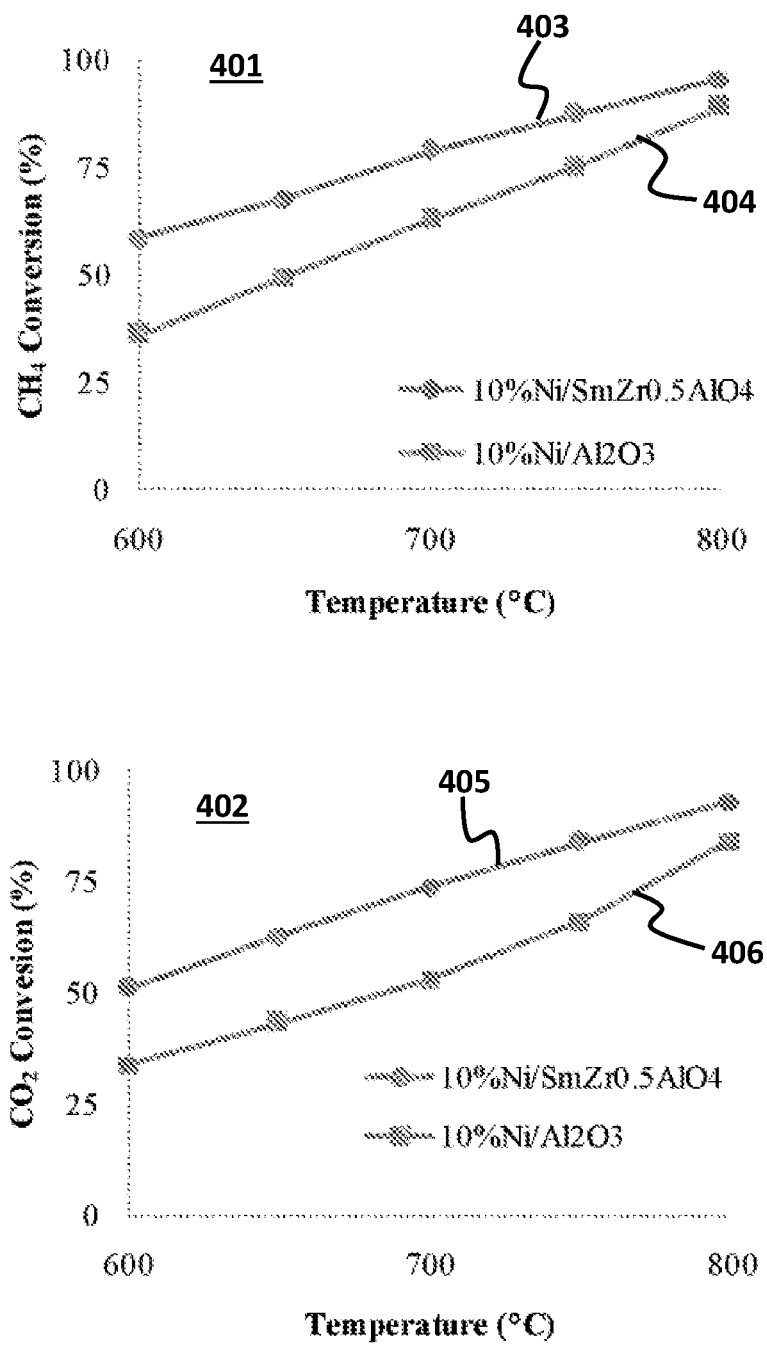
FIG. 4A illustrates a $CH_4$ conversion chart and $CO_2$ conversion chart for dry reforming of methane (DRM) reactions, according to an implementation of the present disclosure.

FIG. 4A illustrates a $CH_4$ conversion chart ("$CH_4$ chart") 401 and a $CO_2$ conversion chart ("$CO_2$ chart") 402 for DRM reactions. The $CH_4$ chart 401 shows conversions of $CH_4$ versus reaction temperature for two series of reactions, namely, the DRM reaction utilizing 10% $Ni/SmZr_{0.5}AlO_4$ nanocatalyst (a first series 403) and the DRM reaction utilizing 10% $Ni/Al_2O_3$ catalyst (a second series 404). The $CO_2$ chart 402 below shows conversions of $CO_2$ versus reaction temperature for two series of reactions, namely, the DRM reaction utilizing 10% $Ni/SmZr_{0.5}AlO_4$ nanocatalyst (a third series 405) and the DRM reaction utilizing 10% $Ni/Al_2O_3$ catalyst (a fourth series 406). Referring to the first series 403 and the second series 404 of the $CH_4$ chart 401, it is observed that raising the reaction temperature from 600 to 800° C. results in increasing the conversions in both the first series 403 and the second series 404, however utilizing 10% $Ni/SmZr_{0.5}AlO_4$ nanocatalyst results in higher $CH_4$ conversions. Referring to the third series 405 and the fourth series 406 of the $CO_2$ chart 402, it is observed that raising the reaction temperature from 600 to 800° C. results in increasing the conversions in both the third series 405 and the fourth series 406, however utilizing 10% $Ni/SmZr_{0.5}AlO_4$ nanocatalyst results in higher $CO_2$ conversions.

Figure 4B:
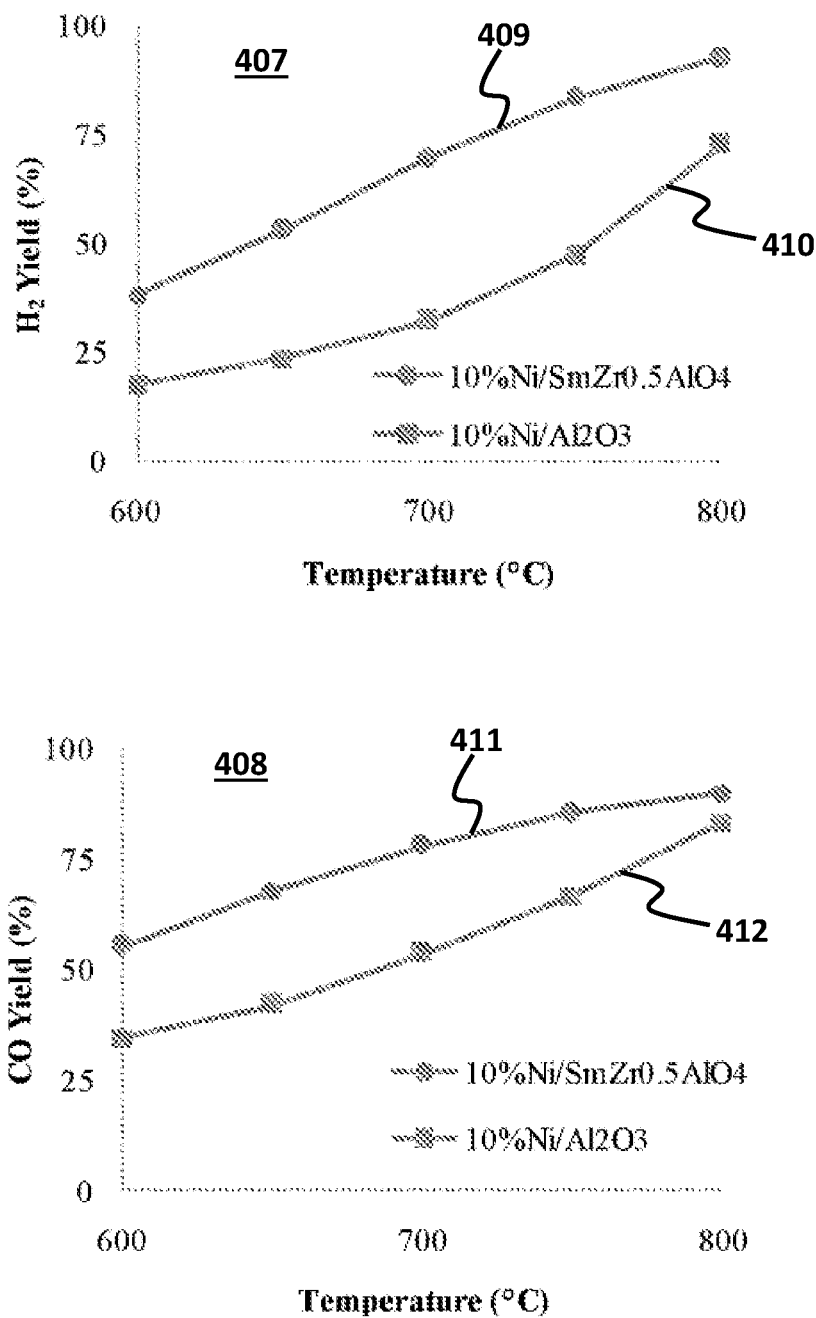
FIG. 4B illustrates $H_2$ yield chart and CO yield chart for DRM reactions according to an implementation of the present disclosure.

FIG. 4B illustrates an $H_2$ yield chart ("$H_2$ chart") 407 and a CO yield chart ("CO chart") 408 for DRM reactions. The $H_2$ chart 407 shows $H_2$ yield versus reaction temperature for two series of reactions, namely, the DRM reaction utilizing 10% $Ni/SmZr_{0.5}AlO_4$ nanocatalyst (a first series 409) and the DRM reaction utilizing 10% $Ni/Al_2O_3$ catalyst (a second series 410). The CO chart 408 shows CO yield versus reaction temperature for two series of reactions, namely, the DRM reaction utilizing 10% $Ni/SmZr_{0.5}AlO_4$ nanocatalyst (a third series 411) and the DRM reaction utilizing 10% $Ni/Al_2O_3$ catalyst (a fourth series 412). Referring to the first series 409 and the second series 410 of the $H_2$ chart 407, it is observed that raising the reaction temperature from 600 to 800° C. results in increasing the $H_2$ yield in both the first series 409 and the second series 410, however utilizing 10% $Ni/SmZr_{0.5}AlO_4$ nanocatalyst results in higher $H_2$ yields. Referring to the third series 411 and the fourth series 412 of the CO chart 408, it is observed that raising the reaction temperature from 600 to 800° C. results in increasing the CO yields in both the third series 411 and the fourth series 412, however utilizing 10% $Ni/SmZr_{0.5}AlO_4$ nanocatalyst results in higher CO yields.

Figure 4C:
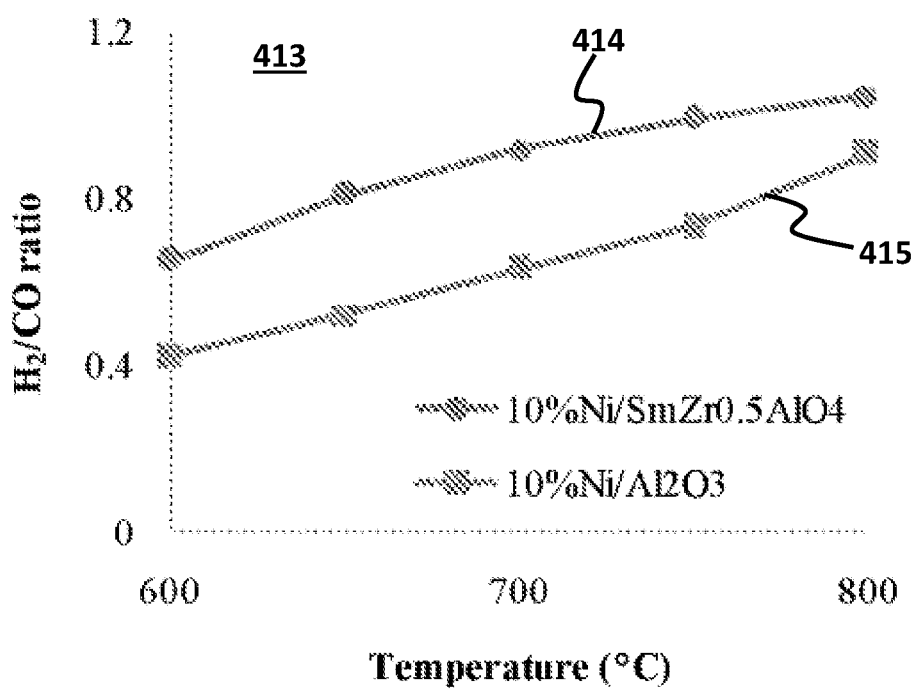
FIG. 4C illustrates $H_2/CO$ ratio chart for DRM reactions according to an implementation of the present disclosure.

FIG. 4C illustrates an $H_2/CO$ ratio chart ("$H_2/CO$ chart") 413 for DRM reactions. The $H_2/CO$ chart 413 shows $H_2/CO$ ratio versus reaction temperature for two series of reactions, namely, the DRM reaction utilizing 10% $Ni/SmZr_{0.5}AlO_4$ nanocatalyst (a first series 414) and the DRM reaction utilizing 10% $Ni/Al_2O_3$ catalyst (a second series 415). Referring to the first series 414 and the second series 415, in the DRM reaction, the $H_2/CO$ ratio increases with temperature enhancement.

Figure 5A:
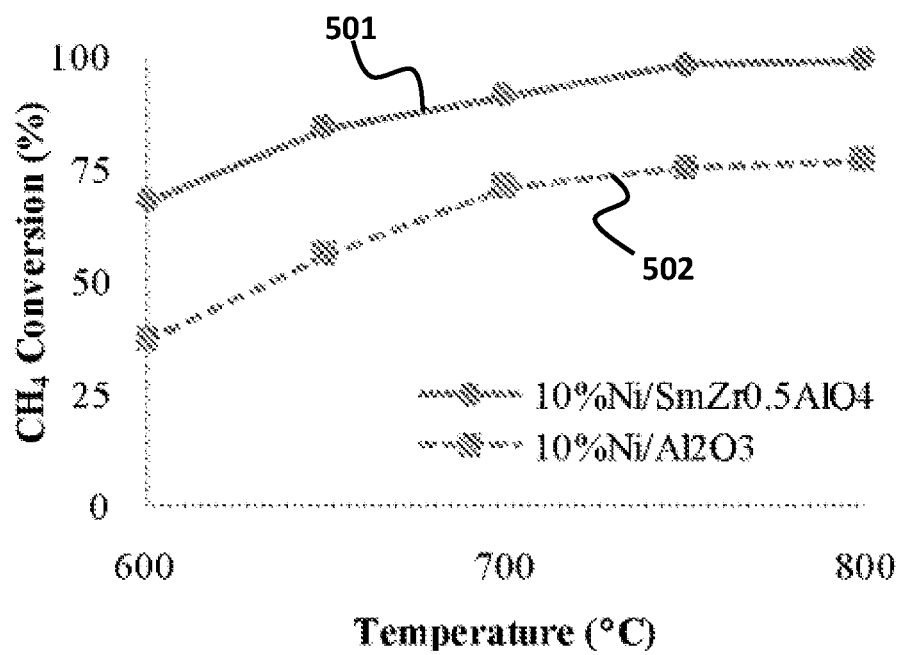
FIG. 5A is $CH_4$ conversion versus reaction temperature chart for two series of steam reforming (SRM) reactions, according to an implementation of the present disclosure.

FIG. 5A is a $CH_4$ conversion versus reaction temperature chart for two series of SRM reactions, namely, the SRM reaction utilizing 10% $Ni/SmZr_{0.5}AlO_4$ nanocatalyst (a first series 501) and the SRM reaction utilizing 10% $Ni/Al_2O_3$ catalyst (a second series 502). Referring to the first series 501 and the second series 502, it is observed that raising the reaction temperature from 600 to 800° C. results in increasing the conversions in both the first series 501 and the second series 502, however utilizing 10% Ni/SmZr$_{0.5}$AlO$_4$ nanocatalyst results in higher CH$_4$ conversions.

Figure 5B:
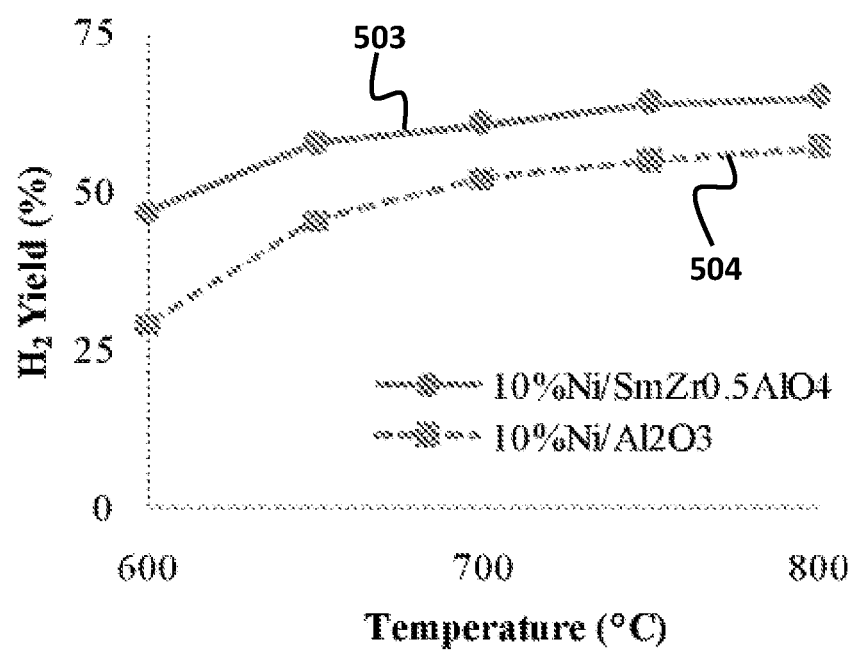
FIG. 5B is $H_2$ yield versus reaction temperature chart for two series of SRM reactions, according to an implementation of the present disclosure.

FIG. 5B is an H$_2$ yield versus reaction temperature chart for two series of SRM reactions, namely, the SRM reaction utilizing 10% Ni/SmZr$_{0.5}$AlO$_4$ nanocatalyst (a first series 503) and the SRM reaction utilizing 10% Ni/Al$_2$O$_3$ catalyst (a second series 504). Referring to the first series 503 and the second series 504, it is observed that raising the reaction temperature from 600 to 800° C. results in increasing H$_2$ yield in both the first series 503 and the second series 504, however utilizing 10% Ni/SmZr$_{0.5}$AlO$_4$ nanocatalyst results in higher H$_2$ yields.

Figure 5C:
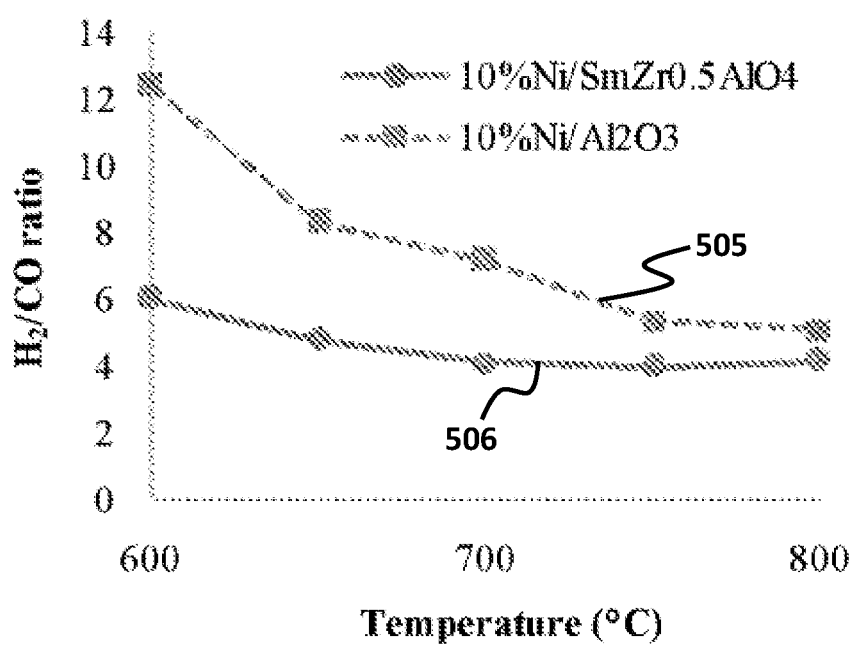
FIG. 5C is H$_2$/CO ratio versus reaction temperature chart for two series of SRM reactions, according to an implementation of the present disclosure.

FIG. 5C is an H$_2$/CO ratio versus reaction temperature chart for two series of SRM reactions, namely, the SRM reaction utilizing 10% Ni/SmZr$_{0.5}$AlO$_4$ nanocatalyst (a first series 505) and the SRM reaction utilizing 10% Ni/Al$_2$O$_3$ catalyst (a second series 506). Referring to the first series 505 and the second series 506, in the SRM reaction, the H$_2$/CO ratio decreases with increasing the temperature. Not bound by any particular theory, this may be due to higher H$_2$ consumption through the reverse water gas-shift reaction at higher temperatures. The reverse water-gas shift reaction is as follows:

$$H + CO_2 \rightarrow H_2O + CO \quad \Delta H°_{298K} = +41 \text{ kJ/mol}$$

Figure 6A:
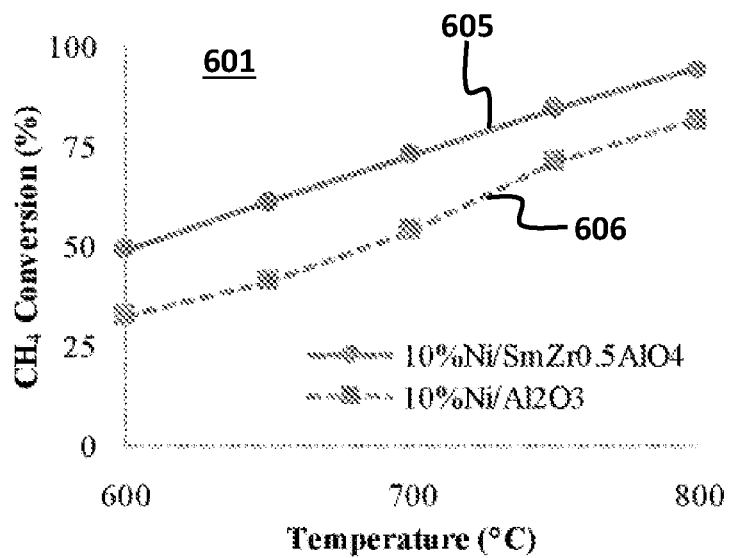
FIG. 6A is CH$_4$ conversion versus reaction temperature chart for two series of combined reforming (CRM) reactions, according to an implementation of the present disclosure.
Figure 6A:
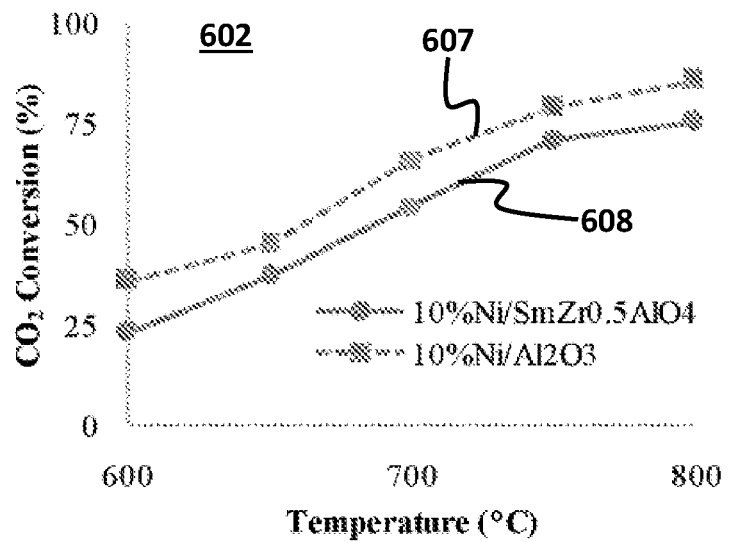

FIG. 6A illustrates a CH$_4$ conversion chart ("CH$_4$ chart") 601 and a CO$_2$ conversion chart ("CO$_2$ chart") 602 for CRM reactions. The CH$_4$ chart 601 shows conversions of CH$_4$ versus reaction temperature for two series of reactions, namely, the CRM reaction utilizing 10% Ni/SmZr$_{0.5}$AlO$_4$ nanocatalyst (a first series 605) and the CRM reaction utilizing 10% Ni/Al$_2$O$_3$ catalyst (a second series 606). The CO$_2$ chart 602 shows conversions of CO$_2$ versus reaction temperature for two series of reactions, namely, the CRM reaction utilizing 10% Ni/SmZr$_{0.5}$AlO$_4$ nanocatalyst (a third series 607) and the CRM reaction utilizing 10% Ni/Al$_2$O$_3$ catalyst (a fourth series 608). Referring to the first series 605 and the second series 606 of the CH$_4$ chart 601, it is observed that raising the reaction temperature from 600 to 800° C. results in increasing the conversions in both the first series 605 and the second series 606, however utilizing 10% Ni/SmZr$_{0.5}$AlO$_4$ nanocatalyst results in higher CH$_4$ conversions. Referring to the third series 607 and the fourth series 608 of the CO$_2$ chart 602, it is observed that raising the reaction temperature from 600 to 800° C., results in increasing the conversions in both the third series 607 and the fourth series 608, however utilizing 10% Ni/SmZr$_{0.5}$AlO$_4$ nanocatalyst results in higher CO$_2$ conversions.

Figure 6B:
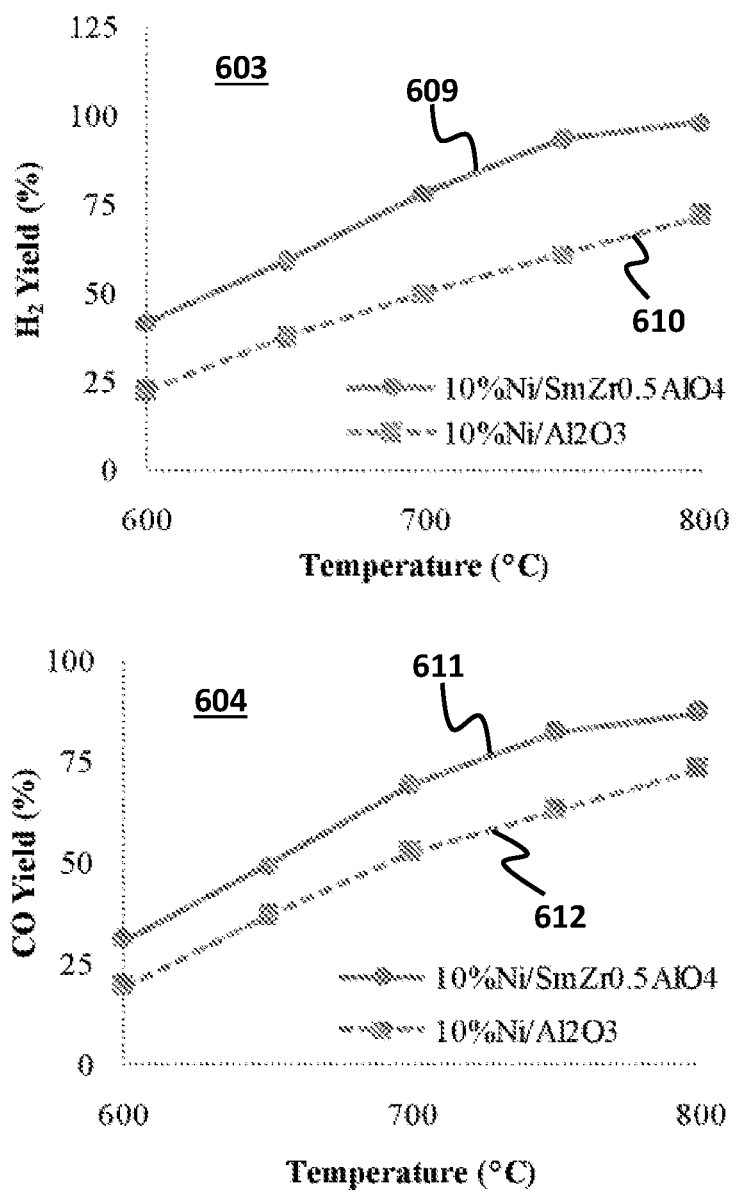
FIG. 6B is H$_2$ yield versus reaction temperature chart for two series of CRM reactions, according to an implementation of the present disclosure.

FIG. 6B illustrates an H$_2$ yield chart ("H$_2$ chart") 603 and a CO yield chart ("CO chart") 604 for CRM reactions. The H$_2$ chart 603 shows H$_2$ yield versus reaction temperature for two series of reactions, namely, the CRM reaction utilizing 10% Ni/SmZr$_{0.5}$AlO$_4$ nanocatalyst (a first series 609) and the CRM reaction utilizing 10% Ni/Al$_2$O$_3$ catalyst (a second series 610). The CO chart 604 shows CO yield versus reaction temperature for two series of reactions, namely, the CRM reaction utilizing 10% Ni/SmZr$_{0.5}$AlO$_4$ nanocatalyst (a third series 611) and the CRM reaction utilizing 10% Ni/Al$_2$O$_3$ catalyst (a fourth series 612). Referring to the first series 609 and the second series 610 of the H$_2$ chart 603, it is observed that raising the reaction temperature from 600 to 800° C. results in increasing the H$_2$ yield in both the first series 609 and the second series 610, however utilizing 10% Ni/SmZr$_{0.5}$AlO$_4$ nanocatalyst results in higher H$_2$ yields. Referring to the third series 611 and the fourth series 612 of the CO chart 604, it is observed that raising the reaction temperature from 600 to 800° C. results in increasing the CO yields in both the third series 611 and the fourth series 612, however utilizing 10% Ni/SmZr$_{0.5}$AlO$_4$ nanocatalyst results in higher CO yields.

Figure 6C:
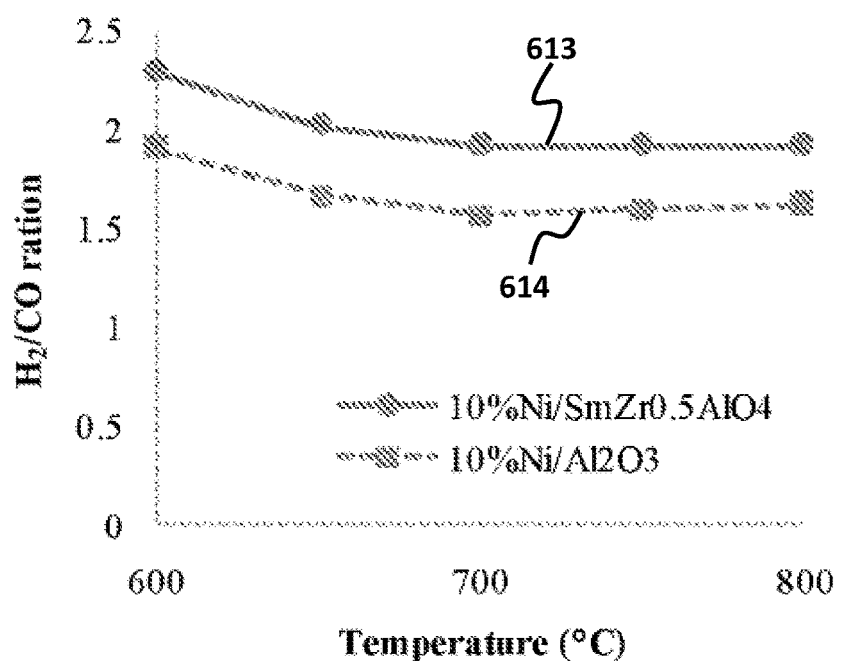
FIG. 6C is H$_2$/CO ratio versus reaction temperature chart for two series of CRM reactions, according to an implementation of the present disclosure.

FIG. 6C illustrates an H$_2$/CO ratio chart for two series of CRM reactions, namely, the CRM reaction utilizing 10% Ni/SmZr$_{0.5}$AlO$_4$ nanocatalyst (a first series 613) and the CRM reaction utilizing 10% Ni/Al$_2$O$_3$ catalyst (a second series 614). Referring to the first series 613 and the second series 614, in the CRM reaction, the H$_2$/CO ratio decreases with temperature.

Referring back to each of the charts presented in FIGS. 4A-B, 5A-B, and 6A-B, it is observed that in all DRM, SRM, and CRM reactions, raising the reaction temperature results in an increase in both conversions and yields. A comparison of the activity of the two SmZr$_{0.5}$AlO$_4$ and γ-Al$_2$O$_3$ supports confirms that the former has a very positive effect on the activity and stability of the catalyst so that in all cases the 10% Ni/SmZr$_{0.5}$AlO$_4$ results in higher conversions and yields. Comparing the CH$_4$ conversions in the DRM, SRM and CRM processes, it is found that the conversions are the highest in the SRM reaction which may be related to the presence of the lowest amount of CO$_2$ in the SRM reaction because of water injection to the system instead of CO$_2$.

Example 3: Stability of the Catalyst

In this example, the stability of the nanocatalyst that is synthesized pursuant to the teachings of the present disclosure is studied. The stability of a catalyst with time may be an important factor especially in the industrial applications. The 10% Ni/SmZr$_{0.5}$AlO$_4$ catalyst and 10% Ni/γ-Al$_2$O$_3$ catalysts were tested for a period of 30 hours on stream in DRM and SRM reactions.

Figure 7A:
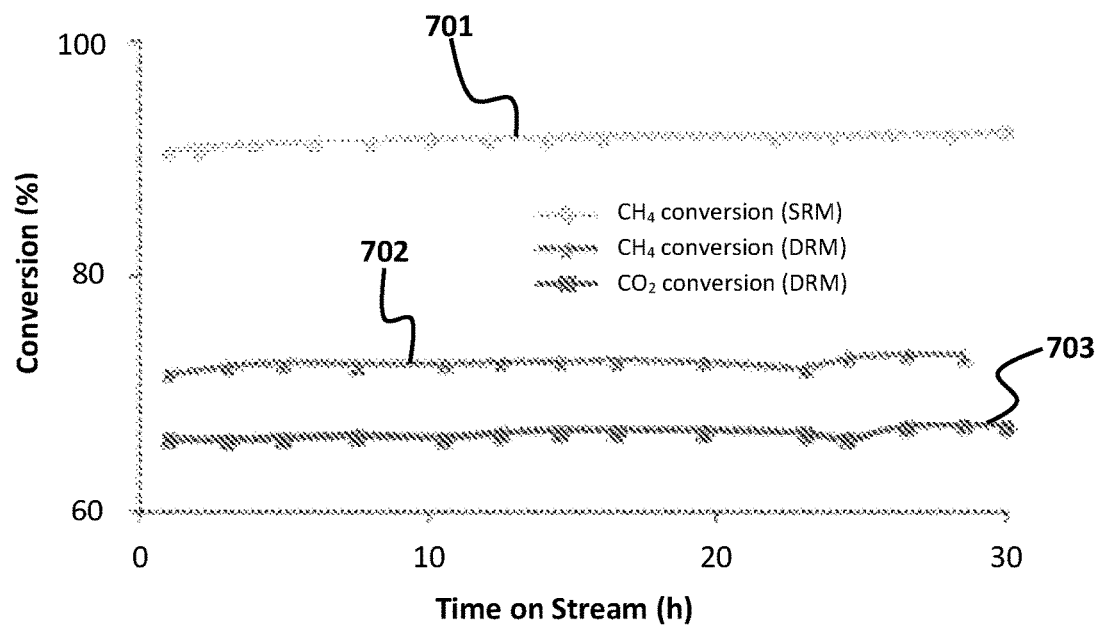
FIG. 7A shows CH$_4$ and CO$_2$ conversions for 10% Ni/SmZr$_{0.5}$AlO$_4$ catalyst that was utilized in the DRM and SRM reactions, according to an implementation of the present disclosure.
Figure 7B:
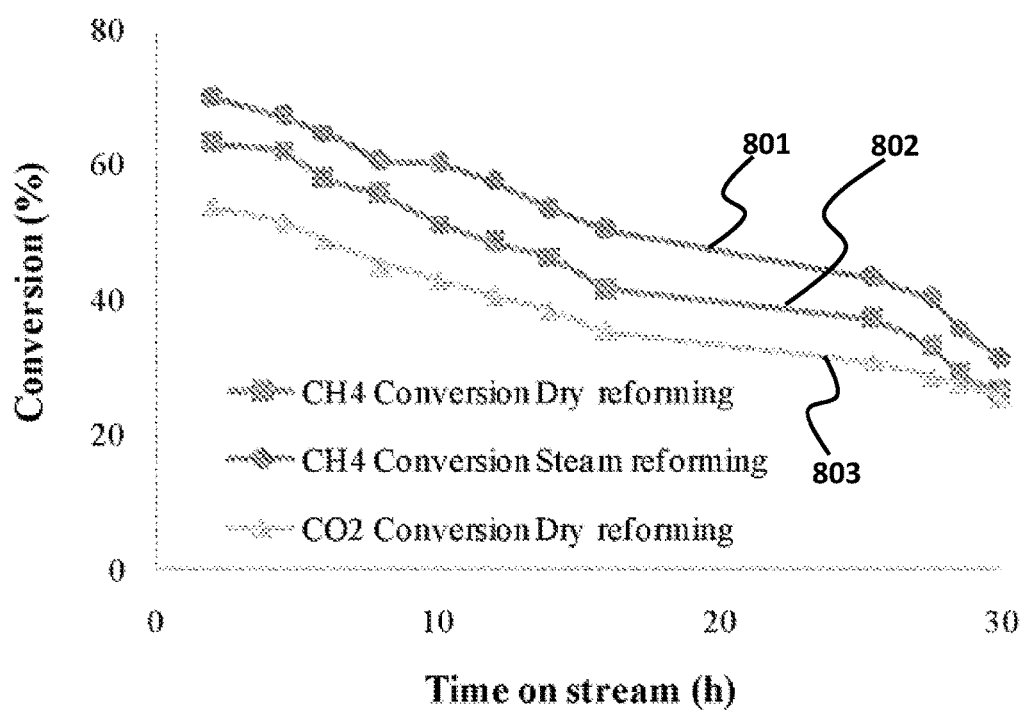
FIG. 7B shows CH$_4$ and CO$_2$ conversions for 10% Ni/γ-Al$_2$O$_3$ catalyst that was utilized in the DRM and SRM reactions, according to an implementation of the present disclosure.

FIG. 7A shows CH$_4$ and CO$_2$ conversions for 10% Ni/SmZr$_{0.5}$AlO$_4$ catalyst that was utilized in the DRM and SRM reactions for a time on stream of 30 hours at a temperature of 700° C. FIG. 7B shows CH$_4$ and CO$_2$ conversions for 10% Ni/γ-Al$_2$O$_3$ catalyst that was utilized in the DRM and SRM reactions for a time on stream of 30 hours at a temperature of 700° C.

Referring to FIG. 7A, CH$_4$ conversion in the SRM reaction (a first series 701), CH$_4$ conversion in the DRM reaction (a second series 702), and CO$_2$ conversion in the DRM reaction (a third series 703) are illustrated in this figure. The CH$_4$ and CO$_2$ conversions are almost constant within 30 hours of the DRM and SRM reactions reflecting the stability of 10% Ni/SmZr$_{0.5}$AlO$_4$ catalyst with time (i.e., no coke deposition or sintering). Furthermore, in the DRM reaction, the CH$_4$ conversions are lower than their corresponding CO$_2$ conversions, which may be attributed to the reverse water-gas shift reaction. It can be observed that higher CH$_4$ conversions are obtained in the SRM reaction compared to the DRM reaction, which may indicate higher efficiency of the SRM process.

Referring to FIG. 7B, CH$_4$ conversion in the SRM reaction (a first series 801), CH$_4$ conversion in the DRM reaction (a second series 802), and CO$_2$ conversion in the DRM reaction (a third series 803) are illustrated. The CH$_4$ and CO$_2$ conversions decrease with time, which may indicate coke deposition and/or sintering of the 10% Ni/γ-Al$_2$O$_3$ catalyst.

As shown the two charts depicted in FIGS. 7A and 7B, the 10% Ni/SmZr$_{0.5}$AlO$_4$ catalyst may be considered as a stable catalyst for the reforming reactions and its utilization may lead to higher conversions and yields especially in the SRM reactions. Not bound by any particular theory, the superior stability of 10% Ni/SmZr$_{0.5}$AlO$_4$ catalyst in comparison with the 10% Ni/γ-Al$_2$O$_3$ catalyst may lie in the structural (spinel) and textural properties of the SmZr$_{0.5}$AlO$_4$ support which is synthesized using samarium and zirconium noble metals offering higher stability.

Example 4: Characterization of the Catalyst

In this fourth example, synthesized 10% Ni/SmZr$_{0.5}$AlO$_4$ catalyst is characterized by X-ray powder diffraction (XRD), Brunauer-Emmett-Teller (BET), transmission electron microscopy (TEM), field emission scanning electron microscopy (FE-SEM), temperature-programmed reduction (TPR), Fourier transform infrared spectroscopy (FTIR), and thermal gravimetric analysis (TGA) techniques. Each of these techniques will be discussed in further detail below.

XRD Analysis

Figure 8:
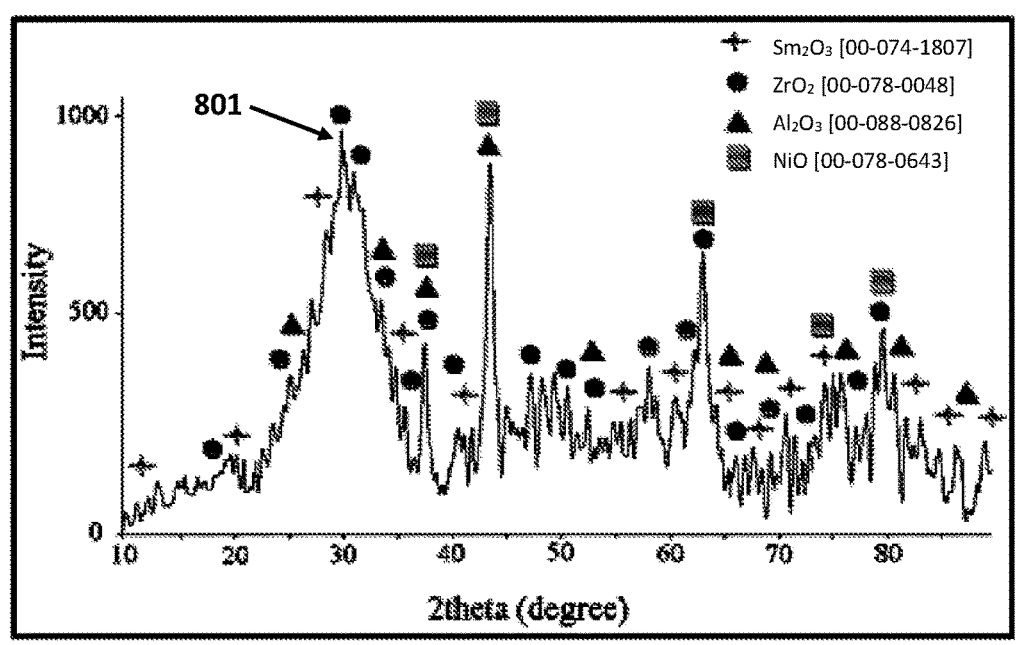
FIG. 8 illustrates the XRD pattern of the 10% Ni/SmZr$_{0.5}$AlO$_4$ catalyst, synthesized as described in detail in connection with example 1, according to an implementation of the present disclosure.

FIG. 8 illustrates the XRD pattern of the 10% Ni/SmZr$_{0.5}$AlO$_4$ catalyst. The characteristic peaks of Sm$_2$O$_3$ (designated by +), ZrO$_2$ (designated by ●), Al$_2$O$_3$ (designated by ▲), and NiO (designated by ■) are observable within the XRD pattern, which may indicate the presence of these metals and confirms the formation of the 10% Ni/SmZr$_{0.5}$AlO$_4$ catalyst. Referring to FIG. 8, a sharpest peak 801 is seen at 2θ=29.890 (intensity=100%) and other sharp peaks appear at 2θ=31.61°, 34.79°, 37.48°, 43.38° and 62.94°. The full-width at half-maximum (FWHM) corresponding to the sharpest two-theta position in the XRD pattern (peak 801) was used to determine the average crystallite size using the Debye-Scherer equation as follows:

$d = 0.9\lambda/\beta \cos\theta$

In the equation above, d is the average crystallite size, X is the X-ray wavelength, β is the FWHM and θ is the diffraction angle. The average crystallite size measured from the XRD diffractogram for the 10% Ni/SmZr$_{0.5}$AlO$_4$ catalyst is 19.2 nm, which is substantially small, reflecting a high availability of active catalytic centers on the catalyst surface for the reactants, leading to higher reaction conversion and efficiency.

Bet Analysis

In order to evaluate the surface areas and pore volumes of the synthesized SmZr$_{0.5}$AlO$_4$ and γ-Al$_2$O$_3$ supports as well as those of 10% Ni/SmZr$_{0.5}$AlO$_4$ and 10% Ni/γ-Al$_2$O$_3$ catalysts, their nitrogen physisorption data were obtained at 77 K. The textural data listed in Table 1 (see below) confirm the formation of mesoporous structures. The pore volume distributions for the fresh SmZr$_{0.5}$AlO$_4$ support and 10% Ni/SmZr$_{0.5}$AlO$_4$ catalyst are comparable. As shown in Table 1, the specific surface areas and pore volumes of the two supports decrease upon impregnation of 10% Ni catalyst. For instance, the BET surface areas are 82.50 m$^2$/g and 74.63 m$^2$/g for the SmZr$_{0.5}$AlO$_4$ and 10% Ni/SmZr$_{0.5}$AlO$_4$, respectively. In fact, it was expected that the impregnation of the active metal leads to reduction in the surface area and pore volume due to filling the surface/pores of support by the metal catalyst. This is also true for the γ-Al$_2$O$_3$ with shows the surface area and pore volume of 120.6 m$^2$/g and 0.1031 cm$^3$/g which are decreased to 92.6 m$^2$/g and 0.0928 cm$^3$/g in the 10% Ni/γ-Al$_2$O$_3$ catalyst. Furthermore, the BET surface area of γ-Al$_2$O$_3$ decreases to 10.5 m$^2$/g after 12 hours at 1000° C., indicating the catalyst is sintered by thermal treatment. It is noteworthy that the reduction of surface area is much lower in case of SmZr$_{0.5}$AlO$_4$ compared with that of the γ-Al$_2$O$_3$ and this can be attributed to the much higher stability of the support against sintering.

TABLE 1

Textural properties of the fresh SmZr$_{0.5}$AlO$_4$ and γ-Al$_2$O$_3$ supports and 10% Ni/SmZr$_{0.5}$AlO$_4$ and 10% Ni/γ-Al$_2$O$_3$ catalysts.

| Sample | BET surface area (m$^2$/g) | Total pore volume (cm$^3$/g) | Micropore volume (cm$^3$/g) | Mesopore volume (cm$^3$/g) | Pore size (nm) | BET surface area after 12 h at 1000° C. (m$^2$/g) |
|---|---|---|---|---|---|---|
| SmZr$_{0.5}$AlO$_4$ | 82.50 | 0.1858 | 0.0022 | 0.1736 | 85.25 | 47.65 |
| 10% Ni/SmZr$_{0.5}$AlO$_4$ | 74.63 | 0.1518 | 0.0022 | 0.1496 | 8.59 | — |
| γ-Al$_2$O$_3$ | 120.6 | 0.1031 | — | — | — | 10.5 |
| 10% Ni/γ-Al$_2$O$_3$ | 92.6 | 0.0928 | — | — | — | — |

TEM Images of the Fresh Support and Catalyst

Figure 9A:
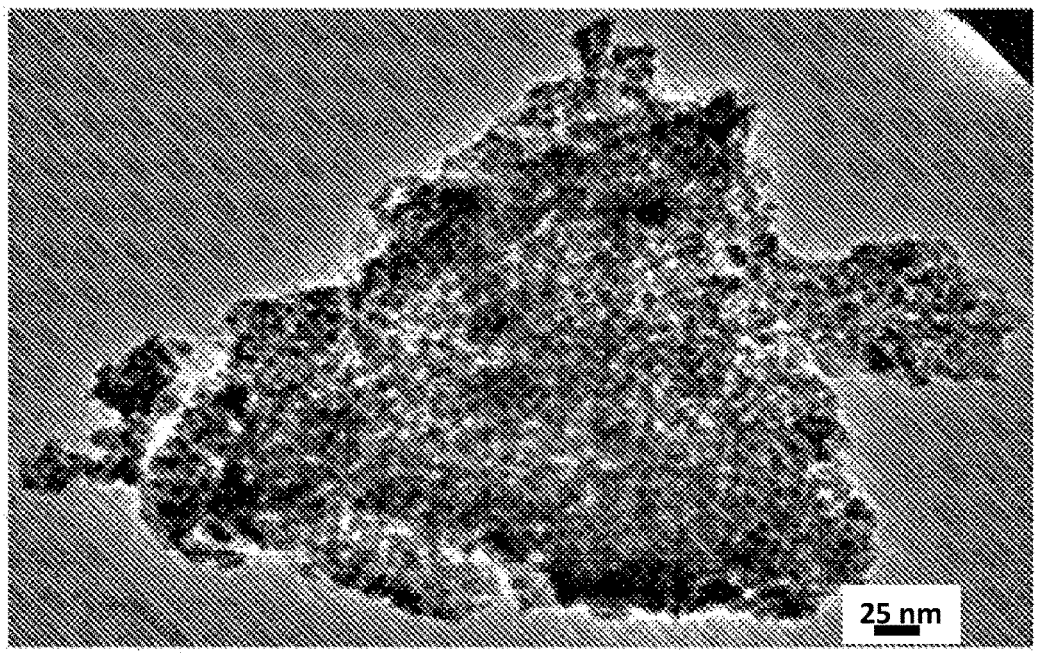
FIG. 9A illustrates transmission electron microscope (TEM) image of the fresh SmZr$_{0.5}$AlO$_4$ support, synthesized as described in detail in connection with example 1, according to an implementation of the present disclosure.
Figure 9B:
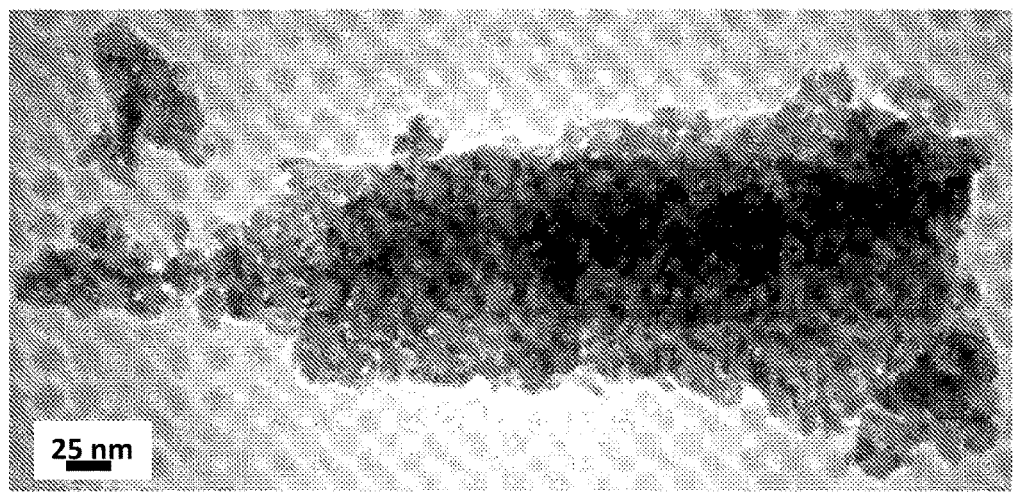
FIG. 9B illustrates transmission electron microscope (TEM) image of the fresh 10% Ni/SmZr$_{0.5}$AlO$_4$ catalyst, synthesized as described in detail in connection with example 1, according to an implementation of the present disclosure.

FIG. 9A illustrates a TEM image of the fresh SmZr$_{0.5}$AlO$_4$ support and FIG. 9B illustrates a TEM image of the fresh 10% Ni/SmZr$_{0.5}$AlO$_4$ catalyst. As used herein, the term fresh means before utilization in the reactions. Referring to FIG. 9B, the catalyst particles have almost spherical morphology. Furthermore, the catalyst particles are below 10 nm in size and the agglomerated particles have sizes below 25 nm. This result reveals that the use of the synthesis method pursuant to the teachings of the present disclosure successfully resulted in production of ultrafine ceramic nanoparticles. It is known that if the catalyst particle size is small, it will usually be in greater contact with the reactants and show higher activity and efficiency.

FE-SEM Micrographs of the Fresh Support and Catalyst

Figure 10A:
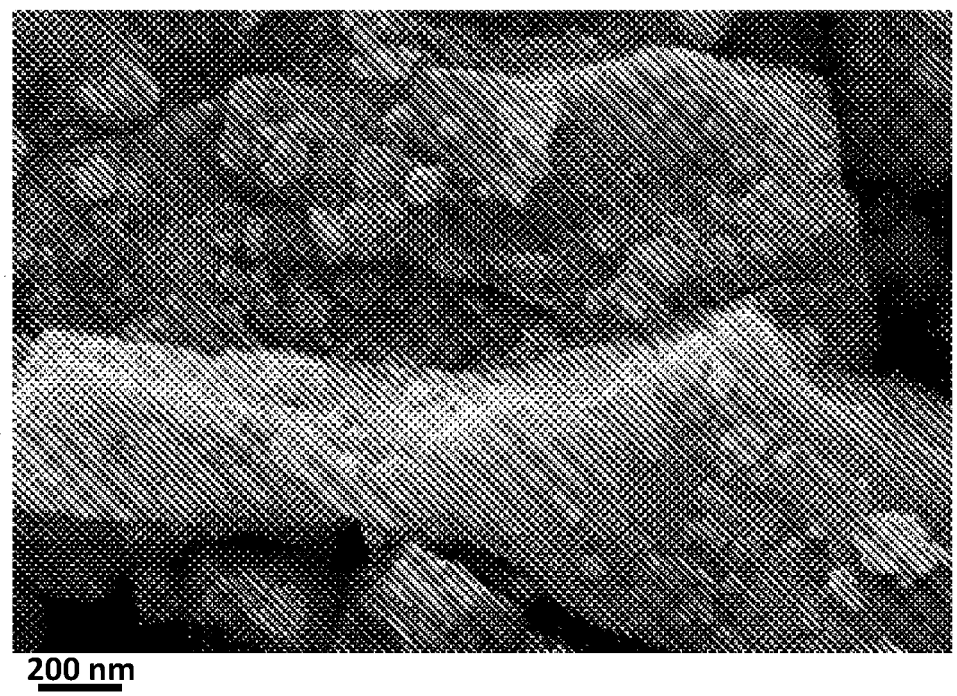
FIG. 10A shows the field emission scanning electron microscope (FE-SEM) micrograph of the fresh SmZr$_{0.5}$AlO$_4$ support, according to an implementation of the present disclosure.
Figure 10B:
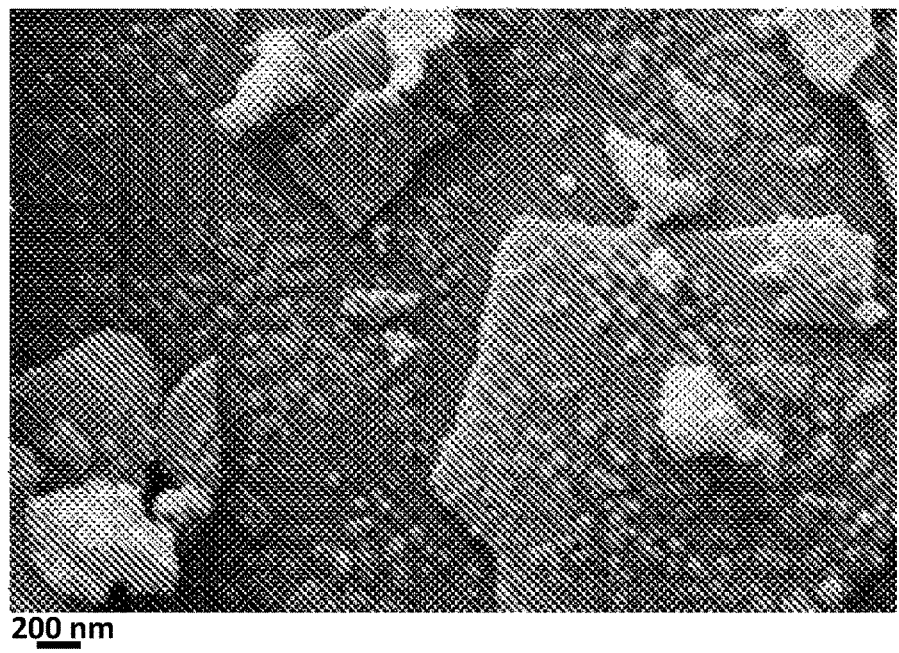
FIG. 10B shows the field emission scanning electron microscope (FE-SEM) micrograph of the 10% Ni/SmZr$_{0.5}$AlO$_4$ catalyst, according to an implementation of the present disclosure.

FIG. 10A shows an FE-SEM micrograph of the fresh SmZr$_{0.5}$AlO$_4$ support and FIG. 10B shows an FE-SEM micrograph of the 10% Ni/SmZr$_{0.5}$AlO$_4$ catalyst exhibiting their surface morphology and particle size. By comparing the FE-SEM images shown in FIGS. 10A and 10B, the irregular porous morphology for the SmZr$_{0.5}$AlO$_4$ support is revealed, while the Ni particles are spherical and are near 60 nm in size. Referring to FIG. 10B, Ni particles that are observable as small spheres that are dispersed beautifully on the surface of the support.

TPR Analysis

Figure 11:
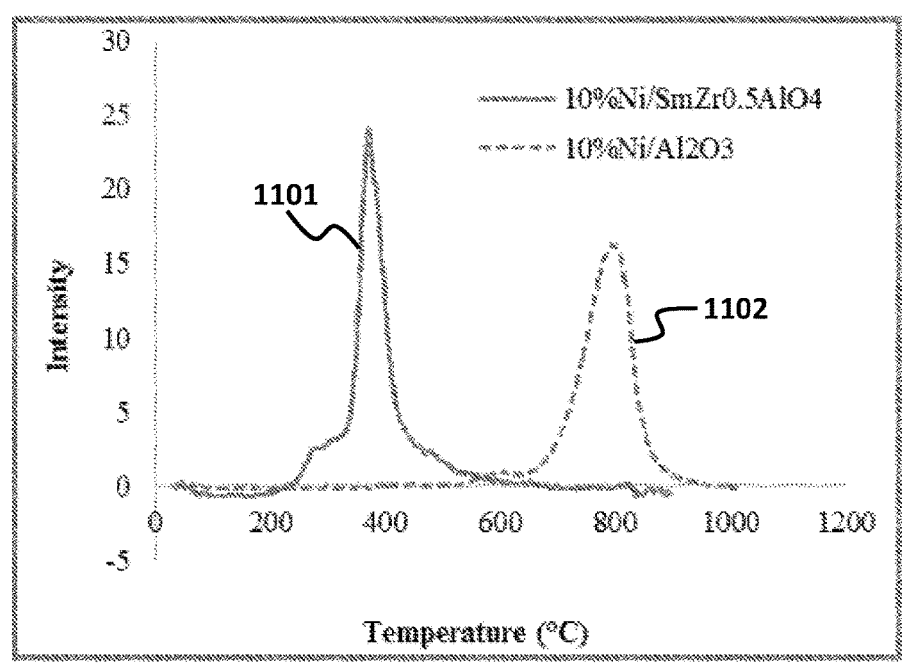
FIG. 11 illustrates temperature-programmed reduction (TPR) diagrams for the 10% Ni/SmZr$_{0.5}$AlO$_4$ catalyst and 10% Ni/γ-Al$_2$O$_3$ catalyst, according to an implementation of the present disclosure.

FIG. 11 illustrates TPR diagrams for the 10% Ni/SmZr$_{0.5}$AlO$_4$ catalyst 1101 and 10% Ni/γ-Al$_2$O$_3$ catalyst 1102. The TPR analysis was performed to find the reduction temperature of the 10% Ni/SmZr$_{0.5}$AlO$_4$ catalyst. Referring to FIG. 11, it can be observed that there is a weak peak at 272.25° C. and a very sharp peak at 369.85° C. that appeared at low temperatures. The two TPR peaks for the 10% Ni/SmZr$_{0.5}$AlO$_4$ catalyst can be assigned to the reduction of NiO (or NiII) to Ni with the peak at 272.25° C. being related to the reduction temperature of Ni particles interacting weakly with the support. The position of the second intensive peak at a higher temperature (369.85° C.) indicates the reduction of nickel oxide species that is in a strong interaction with the SmZr$_{0.5}$AlO$_4$ support. The shift to the low reduction temperature for 10% Ni/SmZr$_{0.5}$AlO$_4$ nanocatalyst may indicate convenient reducibility of the Ni active metal. The decrease in the reduction temperature is important in industry because it lowers the costs of the catalyst reduction. Moreover, this result may justify that the NiAl$_2$O$_4$ spinel phase is not formed, which may lead to availability of more nickel active centers for the reactants and consequently an increase in the reaction conversion.

FE-SEM Images of the Used Catalysts

Figure 12:
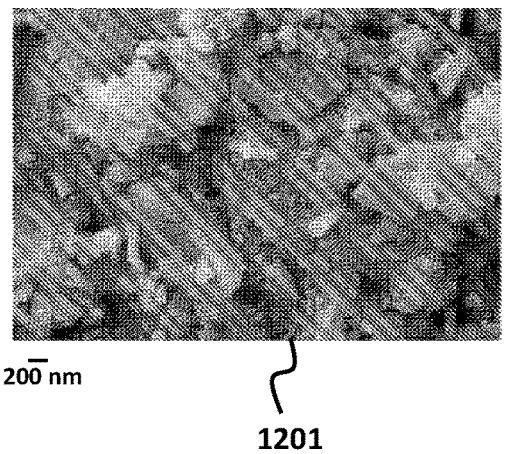
FIG. 12 illustrates the field emission scanning electron microscope (FE-SEM) micrographs of the 10% Ni/SmZr$_{0.5}$AlO$_4$ catalyst used in the steam reforming of methane (SRM), combined reforming of methane (CRM), and dry reforming of methane (DRM), and the FE-SEM image of the 10% Ni/γ-Al$_2$O$_3$ catalyst used in the dry reforming of methane (DRM), according to an implementation of the present disclosure.
Figure 12:
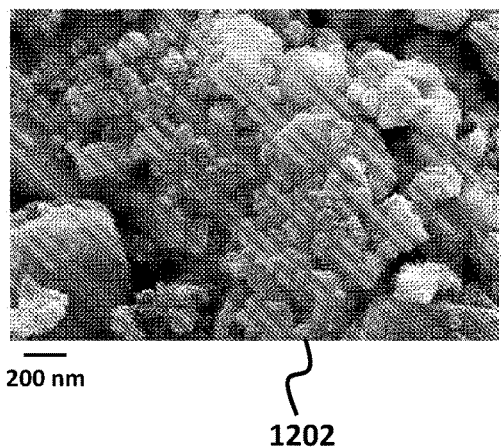
Figure 12:
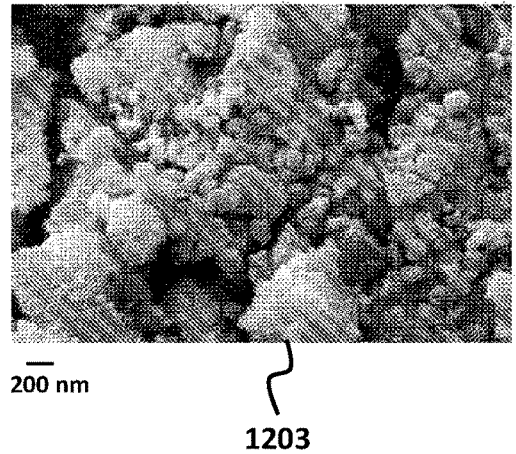
Figure 12:
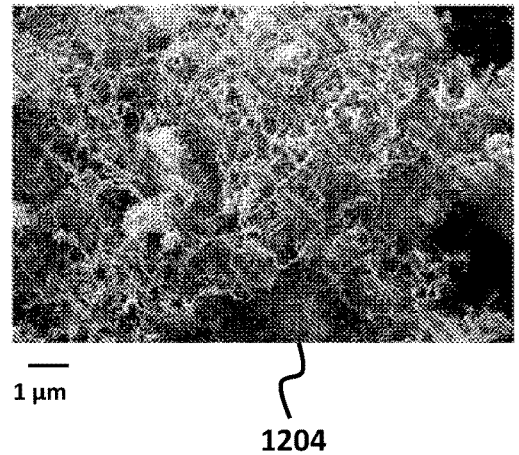

FIG. 12 illustrates the FE-SEM micrographs of the 10% Ni/SmZr$_{0.5}$AlO$_4$ catalyst used in the SRM (designated by 1201), CRM (designated by 1202), DRM (designated by 1203) and the FE-SEM image of the 10% Ni/γ-Al$_2$O$_3$ catalyst used in the DRM (designated by 1204) in order to confirm the absence of the coke formation on the 10% Ni/SmZr$_{0.5}$AlO$_4$ catalyst. It can be seen that while some carbon fibers are formed on the catalyst used in the DRM (designated by 1203) there is not any quantity of coke on the catalysts applied in both the SRM and CRM reactions. Moreover, it can be seen that the 10% Ni/SmZr$_{0.5}$AlO$_4$ catalysts have almost or substantially maintained their spherical morphology and fine dispersion after being used in the reforming processes. Referring to FE-SEM micrograph of the 10% Ni/γ-Al$_2$O$_3$ catalyst used in the DRM (designated by 1204), carbon fiber formation on the catalyst is observed.

TGA Analysis

Figure 13:
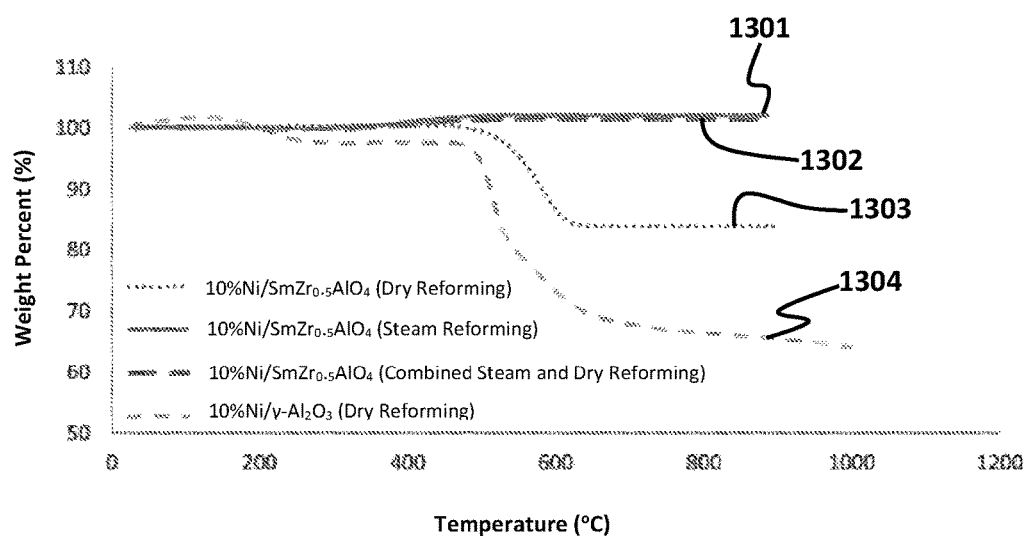
FIG. 13 illustrates thermogravimetric analysis (TGA) profiles of the 10% Ni/γ-Al$_2$O$_3$ and 10% Ni/SmZr$_{0.5}$AlO$_4$ catalysts used in various reforming reactions, according to an implementation of the present disclosure.

FIG. 13 illustrates thermogravimetric analysis (TGA) profiles of the 10% Ni/γ-Al$_2$O$_3$ and 10% Ni/SmZr$_{0.5}$AlO$_4$ catalysts used in various reforming reactions, namely, TGA profile of 10% Ni/SmZr$_{0.5}$AlO$_4$ that was used in SRM (a first profile 1301); TGA profile of 10% Ni/SmZr$_{0.5}$AlO$_4$ that was used in CRM (a second profile 1302); TGA profile of 10% Ni/SmZr$_{0.5}$AlO$_4$ that was used in DRM (a third profile 1303); and TGA profile of 10% Ni/γ-Al$_2$O$_3$ that was used in DRM (a fourth profile 1304). TGA is performed to evaluate the coke formation and its amount on the 10% Ni/SmZr$_{0.5}$AlO$_4$ nano-catalyst used in the DRM and SRM processes. Referring to the third profile 1303 and the fourth profile 1304, carbon deposition on the catalysts that are used in DRM reactions is observed, but no coke formation is observed on either of the catalysts used in the SRM and CRM processes. Interestingly, the TGA diagrams revealed 2.11% and 1.39% increase in the weights of catalysts used in the SRM and CRM reactions, respectively. Also, it is seen that the maximum increase in the catalysts weights occurred above ~500° C. This increase can be due to the entrapment of nitrogen gas used for the TGA analysis within the catalysts pores because after the temperature is raised above 500° C., an increase in the catalyst volume is seen that is almost three times greater than its original volume.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A catalyst support comprising samarium, zirconium and aluminum, wherein the catalyst support has a formula:

$$Sm_{2x}Zr_xAl_{2x}O_4$$

in which x is a molar ratio between 0.3 and 0.6.

2. A catalyst for reforming reactions, the catalyst comprising an active metal supported on a catalyst support, wherein the active metal is selected from the group consisting of nickel, copper, cobalt, noble metals, and combinations thereof, wherein the catalyst support includes samarium, zirconium and aluminum, wherein the catalyst has a formula:

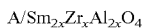

in which x is a molar ratio between 0.3 and 0.6 and A denotes the active metal.

3. A method for preparing a catalyst support, the method comprising:

dissolving samarium, zirconium, and aluminum precursors in water to obtain a first solution;

adding a solution of glycerin to the first solution to obtain a first suspension;

heating the first suspension to obtain a concentrated gel; and calcining the concentrated gel to obtain a powder of the catalyst support.

4. The method according to claim 3, wherein the samarium, zirconium, and aluminum precursors are dissolved in water with a molar ratio of 1:0.5:1.

5. The method according to claim 3, wherein the samarium, zirconium, and aluminum precursors are in the form of water-soluble salts, wherein the water-soluble salts are selected from the group consisting of nitrate, chloride, and acetate salts.

6. The method according to claim 3, wherein the samarium precursor is $Sm(NO_3)_3 \cdot 6H_2O$.

7. The method according to claim 3, wherein the zirconium precursor is selected from the group consisting of $ZrO(NO_3)_2 \cdot xH_2O$, $ZrOCl_2 \cdot xH_2O$, and $ZrCl_2$.

8. The method according to claim 3, wherein the aluminum precursor is $Al(NO_3) \cdot 9H_2O$.

9. The method according to claim 3, wherein the solution of glycerin is added to the first solution such that the weight ratio of the total weight of the salts to the added glycerin becomes 1:10 to 1:20 in the first suspension.

10. The method according to claim 3, further comprising adjusting the pH of the first suspension to an alkaline pH.

11. The method according to claim 3, wherein calcining the concentrated gel to obtain a powder of the catalyst support includes calcining the concentrated gel in a furnace for a specific amount of time at a temperature of between 600° C. and 800° C. with a heating rate of 2° C./min.

12. The method according to claim 3, further comprising washing and drying the powder of the catalyst support.

13. The method according to claim 3, further comprising synthesizing a supported catalyst.

14. The method according to claim 13, wherein synthesizing the supported catalyst further comprises impregnating the catalyst support with an active metal precursor using a wet impregnation method to produce an impregnated catalyst support.

15. The method according to claim 14, wherein synthesizing the supported catalyst further comprises drying the impregnated catalyst support to produce a dried impregnated catalyst support.

16. The method according to claim 15, wherein synthesizing the supported catalyst further comprises calcining the dried impregnated catalyst support to produce a solid supported catalyst.

17. The method according to claim 14, wherein impregnating the catalyst support with an active metal precursor further comprises preparing a solution of an active metal precursor in water under ultrasound irradiation to obtain a prepared solution, and adding the prepared solution to the catalyst support in an ultrasonic bath for the impregnation to occur.

18. The method according to claim 16, wherein calcining the dried impregnated catalyst support further comprises calcining at a temperature of at least 700° C.

19. The method according to claim 18, wherein calcining the dried impregnated catalyst support further comprises calcining the dried impregnated catalyst support for two hours with a specific heating rate of approximately 2° C./min.

* * * * *